United States Patent
Trevillyan et al.

(10) Patent No.: US 7,044,502 B2
(45) Date of Patent: May 16, 2006

(54) DUAL STAGE PYROTECHNIC DRIVER INFLATOR

(75) Inventors: Dennis Trevillyan, Plant City, FL (US); Edward O. Hosey, Lakeland, FL (US)

(73) Assignee: Key Safety Systems, inc., Sterling Heights, MI (US)

(*) Notice: Subject to any disclaimer, the term of this patent is extended or adjusted under 35 U.S.C. 154(b) by 323 days.

(21) Appl. No.: 10/784,299

(22) Filed: Feb. 24, 2004

(65) Prior Publication Data

US 2005/0184498 A1    Aug. 25, 2005

(51) Int. Cl.
*B60R 21/264* (2006.01)
(52) U.S. Cl. ................................. 280/741; 280/736
(58) Field of Classification Search ............. 280/736, 280/741, 742; 102/530, 531
See application file for complete search history.

(56) References Cited

U.S. PATENT DOCUMENTS

| | | | |
|---|---|---|---|
| 5,803,494 A | | 9/1998 | Headley et al. |
| 6,142,515 A | * | 11/2000 | Mika ........................... 280/736 |
| 6,199,906 B1 | | 3/2001 | Trevillyan et al. |
| 6,227,565 B1 | | 5/2001 | McFarland et al. |
| 6,364,353 B1 | * | 4/2002 | Green et al. ................ 280/736 |
| 6,406,053 B1 | * | 6/2002 | Bayer et al. ................. 102/530 |
| 6,966,578 B1 | * | 11/2005 | Smith ........................... 280/736 |
| 2002/0050703 A1 | | 5/2002 | Whang et al. |
| 2003/0030259 A1 | | 2/2003 | Saso et al. |
| 2004/0163565 A1 | * | 8/2004 | Gabler et al. ................ 102/530 |
| 2005/0035579 A1 | | 2/2005 | Canterberry et al. |

FOREIGN PATENT DOCUMENTS

| | | | |
|---|---|---|---|
| EP | 1 090 817 A | | 4/2001 |
| FR | 2 757 119 A | | 6/1998 |

OTHER PUBLICATIONS

U.S. Appl. No. 10/640,031 filed Aug. 14, 2003 for "dual stage pyrotechnic inflator".

* cited by examiner

*Primary Examiner*—David R. Dunn
(74) *Attorney, Agent, or Firm*—Lonnie Drayer; Jarett Rieger

(57) ABSTRACT

The dual stage inflator has a divider plate that separates gas generant in the primary chamber from gas generant in the secondary chamber. Burning of the gas generant yields inflation gas that is useful for inflating a vehicle airbag. The gas generant from the primary chamber is ignited from a separate ignition train than the gas generant in the secondary chamber. The divider plate in the inflator is capable of moving during the operation of the inflator. Before the inflator is fired, the divider plate rests against the inner surface of the lower housing. The divider plate prevents inflation gas from the primary chamber from igniting the secondary chamber. However, when the internal pressure of the secondary chamber exceeds the internal pressure of the primary chamber, the divider plate is displaced in an upward direction thereby permitting the inflation gas from the secondary chamber to flow around the divider plate and out of the inflator.

18 Claims, 4 Drawing Sheets

DUAL STAGE PYROTECHNIC DRIVER INFLATOR

FIELD OF THE INVENTION

The present invention relates to an inflator for rapidly providing inflation gas to fill a vehicle restraint cushion, which is known in the art as an airbag. More particularly, the present invention relates to an improved dual stage inflator that can provide varying rates of inflation to the airbag in accordance with crash severity, occupant size, and/or occupant position.

BACKGROUND OF THE INVENTION

An inflator is utilized in a motor vehicle to rapidly fill an inflatable cushion during a crash. Inflatable cushions are commonly known in the art as airbags. Motor vehicles typically have multiple airbags that are filled with inflation gas from inflators to protect the vehicle occupants from injuries during a crash. The airbag functions by absorbing the vehicle occupant's kinetic energy in a controlled manner to reduce the deceleration forces experienced by the vehicle occupant.

The inflator is a gas-generating device that rapidly produces inflation gas, which is utilized to fill a folded airbag. The pyrotechnic inflator, a commonly utilized inflator in the safety restraint industry, generates inflation gas by burning a gas generant. The gas generant contains a blend of fuel and oxidizer, and upon ignition produces gaseous combustion products. The pyrotechnic inflator may have one or more chambers containing gas generant. A pyrotechnic inflator having gas generant in two chambers, which are ignited independently by two igniters is referred to herein as a dual stage inflator.

The dual stage inflator has several contemplated firing scenarios. First, the primary chamber is fired whereby a fixed quantity of inflation gas is produced. Second, the primary chamber is fired and after a predetermined delay, the secondary chamber is fired. Third, the primary chamber and the secondary chamber are fired simultaneously. The gas output profile, which is a plot of gas pressure in the airbag as a function of time, varies in all of the firing scenarios. The dual stage inflator has the flexibility to tailor the gas output to afford maximum protection to different vehicle occupant sizes and positions.

Many variants of the dual stage inflator have been developed. One variant includes a pancake shaped inflator having a divider plate extending across the length of the inflator dividing the inflator into two stages or combustion chambers. A co-assigned patent, U.S. Pat. No. 6,199,906, along with co-assigned patent application Ser. No. 10/640031, teach a pancake shaped inflator having a first and second gas combustion chambers arranged in a manner where one combustion chamber is stacked on top of the other combustion chamber. Because of the need for dual stage inflators in the safety restraint industry, there is a desire to design cheaper and more reliable dual stage inflators.

SUMMARY OF THE INVENTION

The dual stage inflator in the present invention has three contemplated firing scenarios: single stage output, delayed output, and full output. In single stage output only the gas generant in the primary chamber is lit. In the delayed output scenario, the gas generant is the first chamber is ignited, and after a predetermined amount of time, the gas generant in the secondary chamber is ignited. In full output, the gas generant in both chambers is ignited simultaneously.

An aspect of the present invention is the use of a movable divider plate. The divider plate separates the gas generant in the primary chamber from the secondary chamber. Before the inflator is fired, the bottom rim of the divider plate rests against the inner surface of the lower housing of the inflator. When the internal pressure from the primary chamber is greater than the internal pressure of the secondary chamber, the divider plate remains in contact with the lower housing preventing inflation gas from the secondary chamber from flowing around the divider plate. However, when the internal pressure of the secondary chamber exceeds the internal pressure of the primary chamber, the divider plate is displaced in an upward direction allowing inflation gas from the secondary chamber to flow around the divider plate and out of the inflator via exit ports.

A further aspect of the present invention is the utilization of weld curls to prevent the upward movement of the divider plate. The weld curls are formed from the welding of the upper housing to the lower housing of the inflator. These weld curls interact with the divider plate when the divider plate is moving toward the primary chamber preventing the divider plate from crushing the first filter.

Another aspect of the present invention is the use of an enhancer donut for rapidly igniting the gas generant in the secondary chamber. The enhancer donut is made from a pyrotechnic material having an annular or cylindrical shape. The enhancer donut fits around a portion of the second igniter.

BRIEF DESCRIPTION OF THE DRAWINGS

With this summary of the invention, a detailed description follows with reference being made to the accompanying drawings which form part of the specification in which like parts are designated by the same reference numbers and of which.

DETAILED DESCRIPTION OF THE INVENTION

Figure 1:
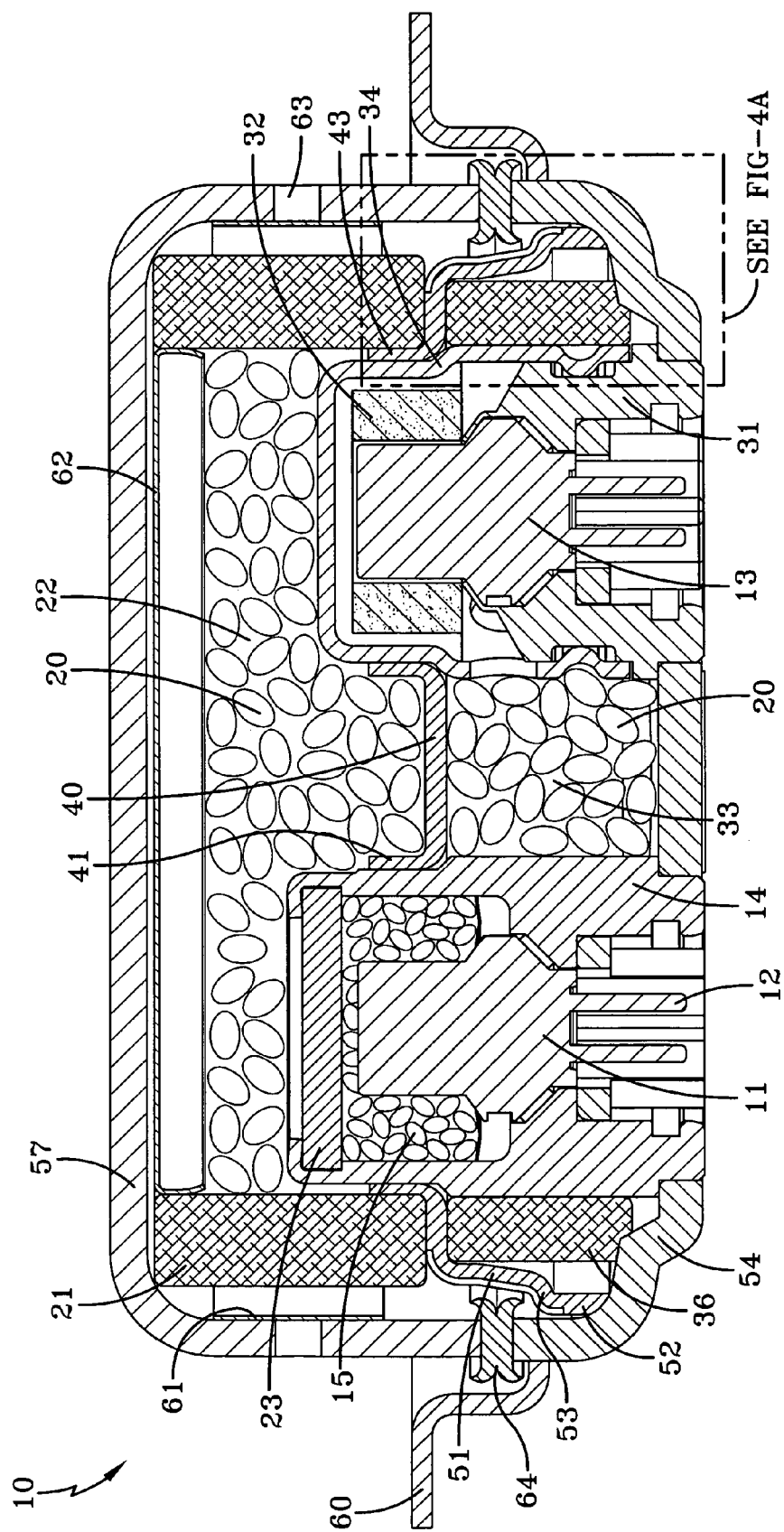
FIG. 1 is a cross sectional view of the inflator in the present invention.
Figure 2:
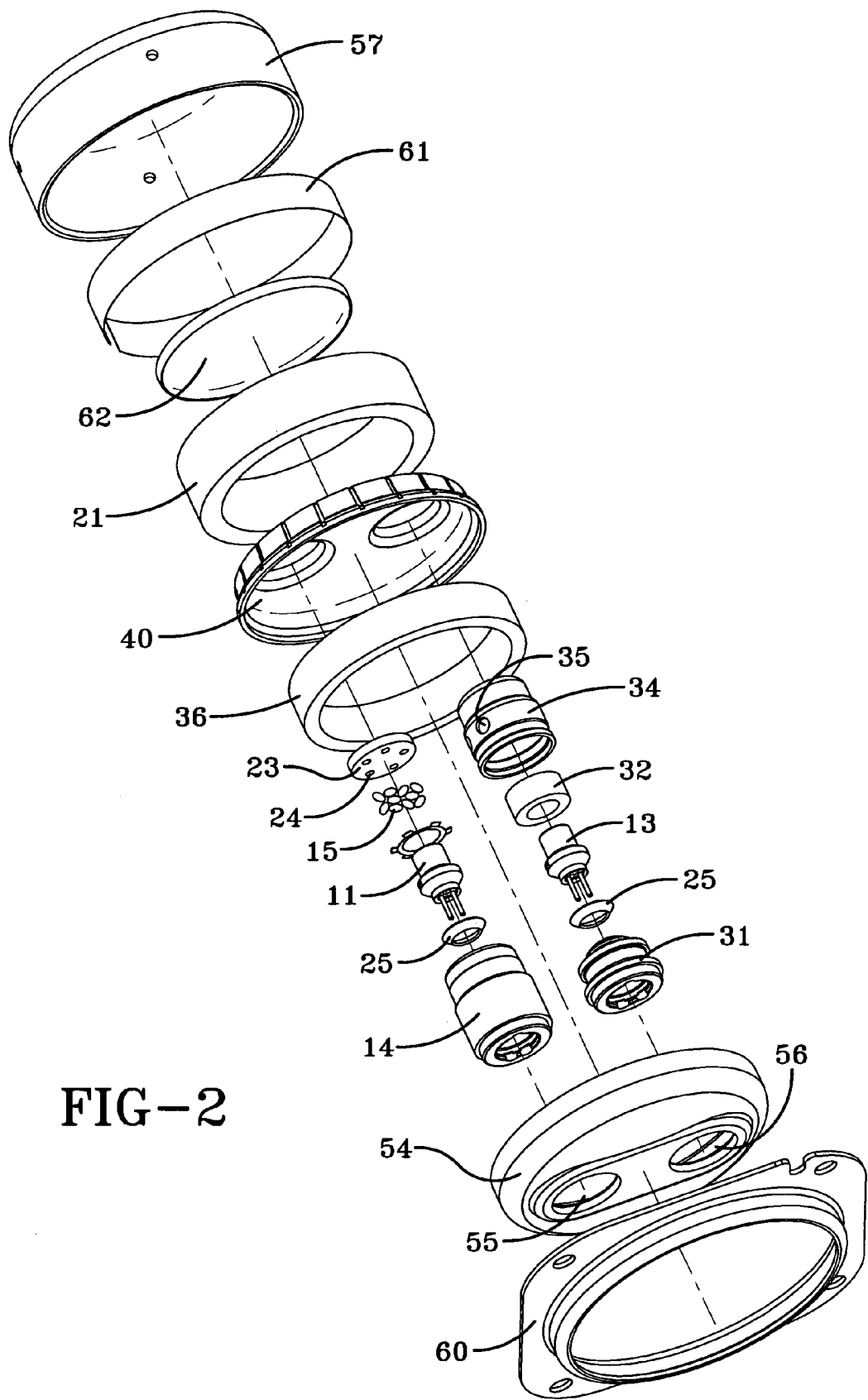
FIG. 2 is an exploded view of the inflator shown in FIG. 1.

With reference to FIGS. 1 and 2, the inflator 10 constructed in accordance with the present invention provides inflation gas to fill a folded airbag (not shown). The inflator 10 has a lower housing 54 fixedly attached to an upper housing 57 via a butt weld or any other suitable means. As used herein and in the claims the terms "upper", "lower," "upward," and "downward" are understood to refer to the relative locations of components of the inflator 10 when the inflator is assembled as seen in FIG. 1. As a result of the welding process, weld curls 64 are formed at the joint between the upper housing 57 and the lower housing 54 extending in the inward and outward directions. The housings are made from a metallic material such as steel, low carbon steel, and the like. The upper housing 57 has a cup shaped configuration with a plurality of exit ports 63 arranged around the circumference thereof. The exit ports 63 provide a passageway for inflation gas to exit the inflator 10 produced from the combustion of gas generant 20 from both the primary chamber 22 and the secondary chamber 33. The lower. housing 54 has a first aperture 55 for receiving the first igniter retainer 14 and a second aperture 56 for receiving the second igniter retainer 31. The first aperture 55 has a generally circular shape and likewise, the second aperture 56 has a generally circular shape. The first aperture 55 and the second aperture 56 are both spaced apart from the center axis of the inflator 10. As used herein, the center axis crosses through both the upper housing 57 and the lower housing 54. Attached to the lower housing 54 of the inflator is a flange 60, which is utilized for securing the inflator to the airbag (not shown).

A first igniter 11 is retained in the first igniter retainer 14 and a second igniter 13 is retained in the second retainer. The first igniter 11 and the second igniter 13 have the same physical components and operate in the same manner, however the first igniter 11 differs from the second igniter 13 in the ignition material load. The first igniter 11 ignites the gas generant 20 in the primary chamber 22 while the second igniter 13 ignites the gas generant 20 in the secondary chamber 33. The inflator 10 shown in FIG. 1 has a first combustion chamber that is larger in volume than the second combustion chamber, and hence the ignition material load for the first igniter 11 is greater than for the second igniter 13.

The igniter is in electrical communication with an electronic control unit (not shown) in a vehicle. The igniter has two electrodes 12 insulated from one another. The electrodes 12 have a bridge wire connecting the two electrodes 12, and the bridge wire is embedded in multiple layers of ignition material such as zirconium potassium perchlorate. The bridge wire has resistance and as current flows through the bridge wire, the bridge wire generates sufficient heat to ignite the ignition material. The electronic control unit receives electrical signals from one or more crash sensors and vehicle occupant sensors. Once the electronic control unit determines a crash is imminent or is occurring, the electronic control unit transmits a firing signal to the igniter, resulting in the firing of the igniter or lighting of the ignition material therein. It is understood that any suitable igniter may be used in the inflator 10 according to the present invention including an igniter employing a semiconductor bridge or any other suitable heating source in place of the bridge wire.

As discussed earlier, the first igniter 11 is retained in the first igniter retainer 14. With reference to FIG. 1, a disk 23 is crimped to the first igniter retainer 14. The disk 23 has a plurality of holes 24 therethrough. Enhancer pellets 15 are loaded in the space formed by the disk 23, the first igniter retainer 14, and the first igniter 11. Alternatively, an annular enhancer pellet may be utilized. The enhancer pellets 15 rapidly burn to yield hot combustion gases that ignite the gas generant 20. The combustion gases produced from the burning of the enhancer pellets 15 travel through the holes 24 into the primary chamber 22. The first igniter retainer 14 is secured to the lower housing 54 by welding or other suitable means, and a silicone washer 25 is employed to create an effective gas seal for the first igniter 11.

Gas generant 20 is present in the primary chamber 22. The gas generant 20 is a pyrotechnic material that rapidly burns to produce inflation gas useful for inflating an airbag. The inflation gas produced from the burning of the gas generant 20 in the primary chamber 22 travels through the first filter 21 and exits the inflator 10 via the exit ports 63. The first filter 21 serves as a heat sink to cool the hot inflation gas. Moreover, the first filter 21 also traps solid particles or slag that is produced from the burning of the gas generant 20 to prevent the solid particles from entering into the airbag cushion. The first filter 21 is made from compressed knitted metal wire or any other suitable material. The first filter 21 is spaced apart from the exit ports 63 to create an air gap or plenum between the outer surface of the first filter 21 and the exit ports 63 of the upper housing 57. The plenum is useful to prevent the first filter 21 from possibly clogging exit ports 63, which may happen if the first filter 21 is in close proximity or in intimate contact with the upper housing 57. Additionally, the plenum is beneficial because the presence of the plenum facilitates the distribution of inflation gas throughout the first filter 21. Without the plenum, the inflation gas might travel in the region of the filter in closest proximity to the first exit ports 63. The exit ports 63 are covered by a burst foil 61, a thin metallic material, adhesively bonded over the first exit ports 63.

The second igniter retainer 31 retains the second igniter 13. The second igniter 13 is retained in the second igniter retainer 31 via crimping or any other suitable attachment means. The second igniter retainer 31 is attached to the lower housing 54 via welding such as laser welding, and a silicone washer 25 is employed to create an en effective gas seal for the second igniter 13. An enhancer tube 34 is attached to the second igniter retainer 31. The enhancer tube 34 has a plurality of holes 35 arranged around the circumference thereof to provide a pathway for gas to flow from the second igniter 13 to the secondary chamber 33. Contained within the enhancer tube 34 is an enhancer donut 32, which partially receives the second igniter 13. The enhancer donut 32 is secured in place via a press fit around the metal cup of the second igniter 13. The enhancer donut 32 is made from a pyrotechnic material that burns rapidly. The second igniter 13 shatters and ignites the enhancer donut 32, which in turn ignites the gas generant 20 in the secondary chamber 33.

Figure 3:
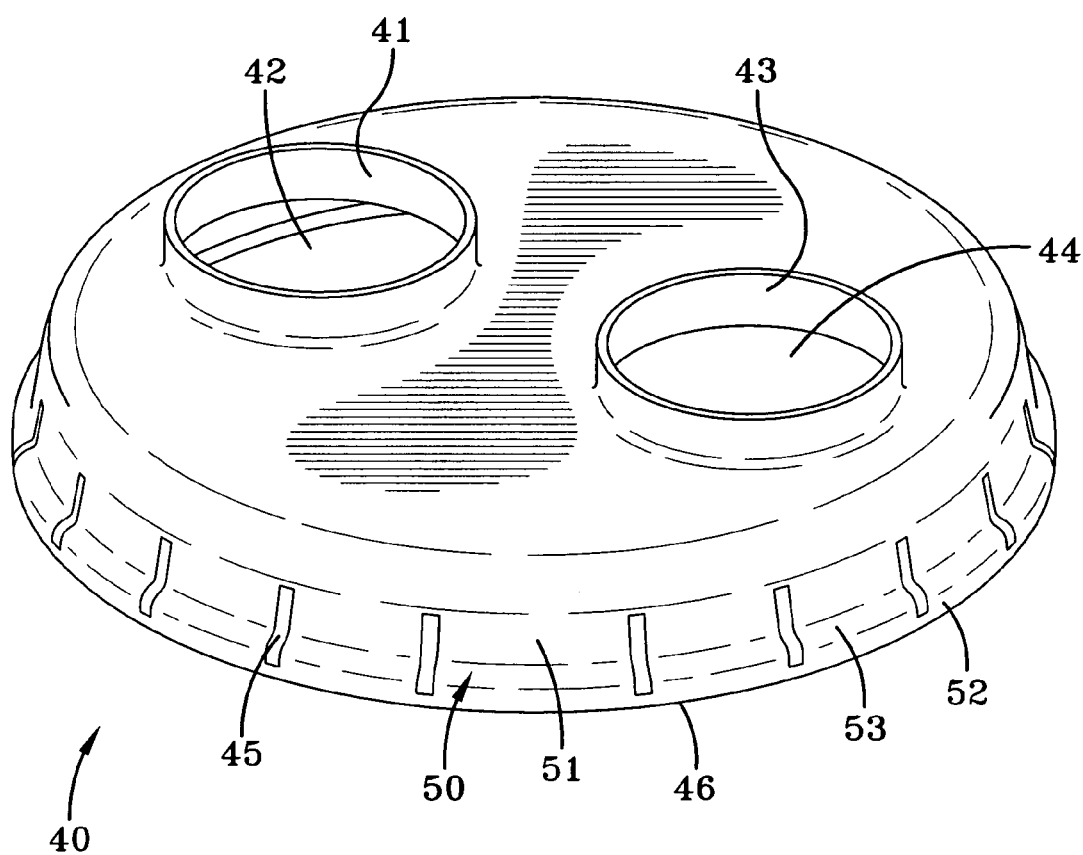
FIG. 3 is a perspective view of the divider plate of the inflator.

The divider plate 40 separates the primary chamber 22 from the secondary chamber 33. The divider plate 40 extends across the diameter of the lower housing 54. As shown in FIG. 3, the divider plate 40 contains a first hole 42 therethrough for receiving the first igniter retainer 14, and the divider plate 40 has a second hole 44 therethrough for receiving the enhancer tube 34, which is attached to the second igniter retainer 31. The divider plate 40 has a first annular extension 41 that defines the first hole 42, and the first annular extension 41 extends in the direction towards the primary chamber 22. Similarly, the divider plate 40 has a second annular extension 43 that defines the second hole 44, and the second annular extension 43 extends in the direction of the primary chamber 22. The purpose of the annular extension is to increase the contact area between the first igniter retainer 14 and the divider plate 40 as well as to increase the contact area between the enhancer tube 34 and the divider plate 40. This increased contact area decreases the chance of inflation gas leakage from one chamber to the other chamber, which would cause sympathetic ignition. Sympathetic ignition occurs when the inflation gas from one chamber ignites the gas generant 20 in the other chamber.

With continued reference to FIG. 3, The divider plate 40 has an annular wall 50 that flares outward. The annular wall 50 has three outer surfaces: the first flared surface 51, the contour surface 53, and the second flared surface 52. The first flared surface 51 is the portion of the annular wall 50 that extends beyond the divider plate 40. The contour surface 53 extends past the first flared surface 51, and finally the second flared surface 52 extends past the contour surface 53. The divider plate 40 has a plurality of grooves 45 carved out of the annular wall 50. The grooves 45 are evenly spaced apart and arranged in a radiating direction. The widths of the grooves 45 are approximately 1 mm. The grooves 45 are located on the first flared surface 51, the contour surface 53, and the second flared surface 52. An important aspect of the present invention is that the grooves 45 are not found on the bottom rim 46 of the annular wall 50. In that matter the grooves 45 may not be present on the second flared surface 52 at all, but at the minimum the grooves 45 do not extend to the bottom rim 46 of the annular wall 50. This feature allows the primary chamber 22 to be sealed from the secondary chamber 33, which will be discussed below.

Figure 4A:
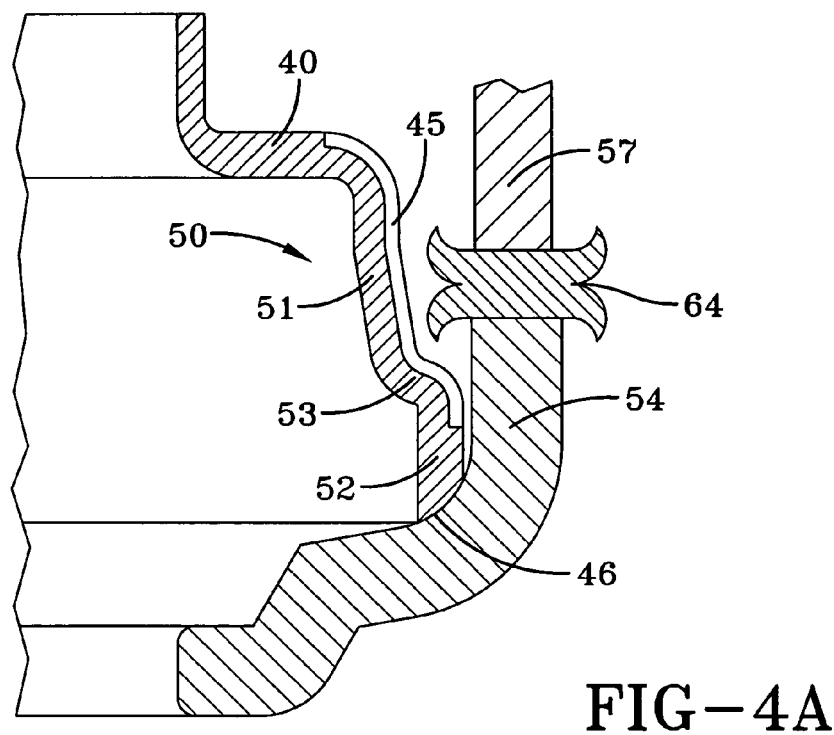
FIG. 4A is an enlarged view of the divider plate resting against the lower housing. The second filter is not represented in this FIG. for clarity purposes

The second flared surface 52 has a complimentary surface to the inner surface of the lower housing 54 as shown in FIG. 1 and FIG. 4A. Before the inflator 10 is fired, the second flared surface 52 of the annular wall 50 rests on the inner surface of the lower housing 54; however, the annular wall 50 of the divider plate 40 is not fixedly attached to the lower housing 54. Not only is the annular wall 50 not fixedly attached to the lower housing 54, the entire divider plate 40 is not fixedly attached to any portion of the inflator 10 enabling the divider plate 40 to be displaced during the firing of the inflator 10.

The inflator 10 in the present invention has two discrete ignition trains. A first igniter 11 initiates the first ignition train while the second igniter ignites the second ignition train. The first igniter 11 and the second igniter 13 each have an ignition material such as zirconium potassium perchlorate. The ignition material from the first igniter 11 ignites the enhancer pellets 15 surrounding the first igniter 11, and similarly, the ignition material from the second igniter 13 ignites the enhancer donut 32. The enhancer pellets 15 and the enhancer donut 32 are made from a pyrotechnic material having a fuel and an oxidizer. The fuel may be selected from one or more of the following: triazole, tetrazole, amino tetrazole, nitroguandine, guanidine nitrate, and the like. The oxidizer may be selected from one or more of the following: oxides, nitrates, ammonium nitrate, chlorates, and the like. The enhancer pellets 15 and the enhancer donut 32 may have the same chemical formulation. The enhancer pellets 15 ignites the gas generant 20 in the primary chamber 22 and the enhancer donut 32 ignites the gas generant 20 in the secondary chamber 33. The gas generant 20 is a pyrotechnic material having a fuel and an oxidizer. The fuel may be selected from one or more of the following: triazole, tetrazole, amino tetrazole, nitroguandine, guanidine nitrate, and the like. The oxidizer may be selected from one or more of the following: oxides, nitrates, ammonium nitrate, chlorates, and the like. The enhancer pellets 15, the enhancer donut 32, and the gas generant 20 may be made from the same fuel and oxidizer. The enhancer pellets 15 and the enhancer donut 32 typically burn at a higher temperature than the burning of the gas generant 20. The purpose of the enhancer pellets 15 is to rapidly ignite the gas generant 20 in the primary chamber 22, and the purpose of the enhancer donut 32 is to rapidly ignite the gas generant 20 in the secondary chamber 33.

The operation of the inflator in the present invention is now set forth. At the onset of a crash, the electronic control unit (not shown) transmits a firing signal to the inflator. There are several different firing scenarios contemplated in the present invention: single staged output, delayed output, and full output. Single stage output occurs where only the first igniter 11 receives a firing signal, which results in inflation gas from the primary chamber 22 being released. Delayed output is the situation where the first igniter 11 is actuated, and after a predetermined amount of time, the second igniter 13 is ignited. Full output exists when the first igniter 11 and the second igniter 13 are fired simultaneously.

Upon receipt of an electrical signal, the first igniter 11 is actuated whereby the ignition material is ignited, which in turn ignites the enhancer pellets 15. The hot combustion gases from the burning of the enhancer pellets 15 quickly flow through the holes 24 in the disk 23 into the primary chamber 22. Consequently, the gas generant 20 in the primary chamber 22 is lit whereby the inflation gas travels through the first filter 21 and out of the inflator 10 via the exit ports 63. With reference to FIG. 4A, the inflation gas from the primary chamber 22 does not flow into the secondary chamber 33 because the pressure associated with the burning of the gas generant 20 in the primary chamber 22 applies pressure on the divider plate 40 in a direction toward the secondary chamber 33. In other words, the burning of gas generant 20 from the primary chamber 22 applies pressure on the divider plate 40 in a downward direction. This pressure maintains surface to surface contact between the second flared surface 52 of the divider plate 40 with the inner surface of the lower housing 54. Since the grooves 45 do not extend to the bottom rim 46 of the annular wall 50, there is no pathway around the annular wall 50 of the divider plate 40 for inflation gas to travel from the primary chamber 22 to the secondary chamber 33. Additionally, the pressure associated with the burning of the gas generant 20 results in a bulging of the upper housing 57 in an upward direction (not shown). The inflator 10 in the present invention includes a filter seal 62 to prevent inflation gas from traveling around the first filter 21 when the upper housing 57 bulges. The filter seal 62 is cup shaped and is press fitted into the first filter 21. The filter seal 62 creates a barrier preventing the inflation gas from circumventing the first filter 21 as the inflation gas leaves the primary chamber 22.

Figure 4B:
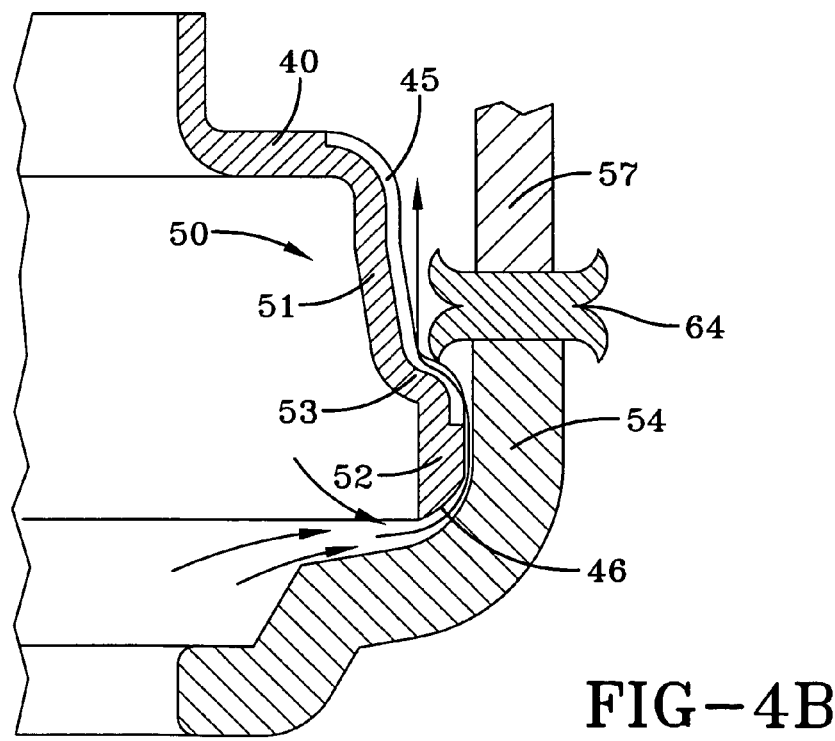
FIG. 4B is a pictorial representation of the flow path of the inflation gas from the secondary chamber around the divider plate. The second filter is not represented in this FIG. for clarity purposes.

Upon receipt of an electrical signal, the second igniter 13 is actuated, which in turn ignites the enhancer donut 32. The hot combustion gases from the burning of the enhancer donut 32 cause the ignition of the gas generant 20 in the secondary chamber 33. The hot inflation gases pass through the second filter 36. The second filter 36 and the first filter 21 are coaxial. The heightened pressure causes the divider plate 40 to be displaced toward the primary chamber 22 if the internal pressure of the secondary chamber 33 is greater than the internal pressure of the primary chamber 22. In other words, when the internal pressure of the secondary chamber 33 is greater than the primary chamber 22, the divider plate 40 moves in an upward direction. The divider plate 40 is displaced upward until being blocked by the weld curls 64. The weld curls 64 prevent the divider plate 40 from continuing to travel toward the primary chamber 22, and the weld curls 64 contact the first flared surface 51 and/or contour surface 53 of the annular wall 50. To ensure that the weld curls 64 do not impede the flow of the inflation gas from the secondary chamber 33, grooves 45 are carved into the annular wall 50 of the divider plate 40. Even when the weld curls 64 interface with the annular wall 50, the inflation gas from the secondary chamber 33 will flow around the weld curls 64 via the grooves 45 as shown by the arrows in FIG. 4B. The inflation gas will continue to flow out of the inflator via the exit ports 63. In order for the inflation gas from the burning of the gas generant in the secondary chamber to exit the inflator, the inflation gas must travel around the outside of the divider plate to reach the exit ports which are arranged along the upper housing.

The internal pressures of the chambers in the present invention will dictate the movement of the divider plate 40. In all three contemplated firing scenarios, the divider plate 40 will initially be pressed against the inner surface of the lower housing 54 thereby sealing the primary chamber 22 from the secondary chamber 33. In the single stage output scenario, the divider plate 40 will maintain contact against the lower housing 54 during the entire burning of the gas generant 20 in the primary chamber 22. In the delayed output, the divider plate 40 will be pressed against the lower housing 54 during the burning of the gas generant 20 in the primary chamber 22. Once the gas generant 20 in the secondary chamber 33 is lit, the divider plate 40 will be held against the lower housing 54 until the internal pressure of the secondary chamber 33 is greater than the primary chamber 22. At this time, the divider plate 40 will move toward the primary chamber 22 allowing inflation gas from the secondary chamber 33 to exit the inflator 10. Lastly, in the full output scenario, the gas generant 20 in both chambers burns at the same time. The divider plate 40 maintains contact with the lower housing 54 until the internal pressure of the secondary chamber 33 is greater than the primary chamber 22.

In the event that the inflator is exposed to a fire or other another source of extreme heat, the inflator is designed to autoignite and function in a normal manner. An autoignition element (not shown) may be placed in intimate thermal contact with the lower housing 54 and another autoignition element may be placed in intimate thermal contact with the upper housing 57. In the event of exposure to high temperature, the autoignition elements ignite the gas generant 20 in the first and second combustion chambers. If an autoignition element was not present in the inflator, the gas generant 20 may melt which would alter the ballistic properties of the gas generant 20.

In all cases it is understood that the above-described embodiments are merely illustrative of but a few of the many possible specific embodiments which represent the applications of the principles of the present invention. Numerous and varied other arrangements can be readily devised by those skilled in the art without departing from the spirit and scope of the invention.

We claim:

1. An inflator for a motor vehicle comprising:
   an upper housing attached to a lower housing forming an exterior surface for the inflator,
   a primary chamber having ignitable gas generant for producing inflation gas,
   a secondary chamber having ignitable gas generant for producing inflation gas, and
   a divider plate for isolating the primary chamber from the secondary chamber, wherein the primary chamber is a space surrounded by the upper housing, a first filter and the divider plate, wherein the secondary chamber is a space surrounded by the lower housing, a second filter, and the divider plate, wherein the divider plate has a first hole for receiving a first igniter and having a second hole for receiving a second igniter, wherein the divider plate extends substantially across an inner diameter of the lower housing,
   wherein the divider plate is movable during operation of the inflator whereby the divider plate is displaced toward the primary chamber when the internal pressure of the secondary chamber is greater than the primary chamber.

2. The inflator according to claim 1 wherein a bottom rim of the divider plate has a surface complimentary to an inner surface of the lower housing.

3. The inflator according to claim 1 further comprising welds curls formed from the welding of the upper housing to the lower housing, the weld curls restrict the movement of the divider plate in the direction of the primary chamber.

4. The inflator according to claim 2 wherein the bottom rim of the divider plate contacts the inner surface of the lower housing before the inflator is actuated.

5. The inflator according to claim 1 further comprising an enhancer donut for igniting the gas generant in the secondary chamber, the enhancer donut receives the second igniter whereby firing of the second igniter ignites the enhancer donut.

6. The inflator according to claim 1 further comprising a disk having a plurality of holes therethrough, the disk separates the gas generant in the primary chamber from enhancer pellets.

7. The inflator according to claim 1 wherein the upper housing has a plurality of exit ports arranged around the circumference thereof for inflation gas to exit the inflator.

8. The inflator according to claim 1 wherein the first filter provides filtering of the inflation gas from burning of the gas generant in the primary chamber, the second filter provides filtering of the inflation gas from burning of the gas generant in the secondary chamber, wherein the first filter and the second filter are coaxial.

9. The inflator according to claim 1 wherein the divider plate has an annular wall, the annular wall has a plurality of grooves that allow inflation gas from the secondary chamber to flow around the divider plate to exit the inflator.

10. An inflator for a motor vehicle comprising:
    an upper housing attached to a lower housing forming an exterior surface for the inflator,
    a primary chamber having ignitable gas generant for producing inflation gas,
    a secondary chamber having ignitable gas generant for producing inflation gas, and
    a divider plate for isolating the primary chamber from the secondary chamber, wherein the primary chamber is a space surrounded by the upper housing, a first filter and the divider plate, wherein the secondary chamber is a space surrounded by the lower housing, a second filter, and the divider plate, wherein the divider plate has a first hole for receiving a first igniter and having a second hole for receiving a second igniter, wherein the divider plate extends substantially across an inner diameter of the lower housing,
    wherein the divider plate has an annular wall, the annular wall comprises a first flared surface, a contoured surface, and a second flared surface, wherein the first flared surface extends from the divider plate, the contour surface is arranged between the first flared portion and the second flared portion, wherein a plurality of grooves are carved into first flared surface, the contoured surface, and the second flared surface in a manner that allows inflation gas from the secondary chamber to flow around the divider plate to exit the inflator.

11. The inflator according to claim 10 wherein a bottom rim of the divider plate has a surface complimentary to an inner surface of the lower housing.

12. The inflator according to claim 10 further comprising welds curls formed from the welding of the upper housing to the lower housing, the weld curls restrict the movement of the divider plate in the direction of the primary chamber.

13. The inflator according to claim 11 wherein the bottom rim of the divider plate contacts the inner surface of the lower housing before the inflator is actuated.

14. The inflator according to claim 10 further comprising an enhancer donut for igniting the gas generant in the secondary chamber, the enhancer donut receives the second igniter whereby firing of the second igniter ignites the enhancer donut.

15. The inflator according to claim 10 further comprising a disk having a plurality of holes therethrough, the disk separates the gas generant in the primary chamber from enhancer pellets.

16. The inflator according to claim 10 wherein the upper housing has a plurality of exit ports arranged around the circumference thereof for inflation gas to exit the inflator.

17. The inflator according to claim 10 wherein the first filter provides filtering of the inflation gas from burning of the gas generant in the primary chamber, the second filter provides filtering of the inflation gas from burning of the gas generant in the secondary chamber, wherein the first filter and the second filter are coaxial.

18. The inflator according to claim 10 wherein the grooves of the annular wall extend only partway along the second flared surface, the grooves are arranged in a radiating direction, whereby the divider plate being movable during operation of the inflator whereby the divider plate is displaced toward the primary chamber when the internal pressure of the secondary chamber is greater than the primary chamber.

* * * * *